United States Patent [19]
Lardy et al.

[11] Patent Number: 5,775,097
[45] Date of Patent: Jul. 7, 1998

[54] TURBOJET ENGINE THRUST REVERSER WITH BIASED BAFFLES

[75] Inventors: Pascal Lardy; Laurent Georges Valleroy; Guy Bernard Vauchel, all of Le Havre, France

[73] Assignee: Societe Hispano-Suiza, Colombes Cedex, France

[21] Appl. No.: 748,910

[22] Filed: Nov. 15, 1996

[30] Foreign Application Priority Data

Nov. 15, 1995 [FR] France ................... 95 13506

[51] Int. Cl.$^6$ .................................. F02K 1/54
[52] U.S. Cl. ............... 60/226.2; 60/230; 239/265.37
[58] Field of Search .................. 60/226.2, 230; 239/265.37, 265.89

[56] References Cited

U.S. PATENT DOCUMENTS

| | | |
|---|---|---|
| 2,847,823 | 8/1958 | Brewer . |
| 3,531,049 | 9/1970 | Hom . |
| 3,550,855 | 12/1970 | Feld et al. . |
| 4,005,836 | 2/1977 | Mutch . |
| 4,129,269 | 12/1978 | Fage . |

FOREIGN PATENT DOCUMENTS

| | | |
|---|---|---|
| 0 574 730 | 12/1993 | European Pat. Off. . |
| 2 704 907 | 11/1974 | France . |
| 2 601 077 | 1/1988 | France . |
| 1 524 741 | 9/1978 | United Kingdom . |
| 2 075 447 | 11/1981 | United Kingdom . |
| WO 93/16279 | 9/1993 | WIPO . |

Primary Examiner—Louis J. Casaregola
Attorney, Agent, or Firm—Bacon & Thomas

[57] ABSTRACT

A thrust reverser is disclosed for a turbojet engine having a nacelle with a plurality of beams extending rearwardly from a rear portion of the nacelle on which are pivotally mounted thrust reverser baffles movable between forward thrust positions and reverse thrust positions. The thrust reverser baffles have forward edges, rear edges forming a portion of an exhaust nozzle when the baffles are in their forward thrust positions, outer baffle surfaces substantially flush with the outer surface of the nacelle when the baffles are in their forward thrust positions, and inner baffle surfaces forming a portion of a gas flow duct when the baffles are in their forward thrust positions, such that the exhaust nozzle has a width H measured in a direction parallel to the width of the beam h such that h is equal or greater than 0.6 H. In order to bias the thrust reverser baffles to remain in their forward thrust positions, the gases within the gas flow duct are prevented from acting on forward portions of the thrust reverser baffles when the baffles are in their forward thrust positions such that the resultant forces of the gases in the gas flow duct acting on the inner baffle surfaces when the baffles are in their forward thrust positions urge the baffles to remain in their forward thrust positions.

11 Claims, 5 Drawing Sheets

TURBOJET ENGINE THRUST REVERSER WITH BIASED BAFFLES

BACKGROUND OF THE INVENTION

The present invention relates to a thrust reverser for a turbojet engine, more particularly such a thrust reverser having one or more thrust reverser baffles biased by the exhaust gases to remain in their forward thrust positions.

Turbojet engine thrust reversers of the "target" or "clamshell door" type typically comprise a plurality of movable thrust reverser baffles mounted on a rear edge of an engine cowling or nacelle such that they are movable between forward thrust positions and reverse thrust positions. In their forward thrust positions, the baffles form a portion of the exhaust nozzle for the jet engine. These types of thrust reversers have relatively simply kinematics which cause the doors to pivot into reverse thrust positions so as to redirect the exhaust gases in a direction having a reverse thrust component.

Typical thrust reversers are illustrated in U.S. Pat. No. 4,005,836 in which the door opening operation is achieved by a system of bars both raising and pivoting the thrust reverser baffles, and U.S. Pat. No. 3,550,855 which, along with French Patent 2,348,371 discloses a structure wherein the pivots are located downstream of the baffles relative to the engine exhaust when the baffles are in their reverse thrust positions. U.S. Pat. No. 2,847,823 discloses such a thrust reverser system utilizing a stationary rear ring located downstream, or to the rear, of the pivoting thrust reverser baffles.

FIG. 1 illustrates a typical structure of the known thrust reversers. The structure usually comprises an upstream cowling or nacelle 1 affixed to the turbojet engine 2 and having an inner wall 3 which forms an external boundary of an annular gas circulation duct 4 and an outer wall 5 affixed to the inner wall 3. Extending rearwardly from the structure 1 are two side structures 6. Two thrust reverser baffles 7a and 7b are pivotally attached to the side structures 6 so as to pivot about pivot axes 8. Side structures 6 also contain and support a control system for displacement of the thrust reverser baffles between the forward thrust positions, illustrated in FIG. 1, and the reverse thrust positions. Since the downstream edges of the thrust reverser baffles 7a and 7b are in close contact when the baffles are in their reverse thrust positions, the downstream edges 9a and 9b are not co-planar when the baffles 7a and 7b are in their forward thrust positions as illustrated in FIG. 1. As can be seen, the edges 9a and 9b extend obliquely to the longitudinal axis L.

Although generally successful, these types of known thrust reverser baffles are not completely without drawbacks. Specifically, the force on the thrust reverser baffles 7a and 7b exerted by the pressurized gases within the circulation duct 4 tend to urge the baffles toward their reverse thrust positions. Such a feature could prove catastrophic should the actuating mechanisms, or locking mechanisms fail to operate properly. As noted above, the downstream edges 9a and 9b of the respective thrust reverser baffles are not co-planar and extend obliquely to the longitudinal axis L when baffles 7a and 7b are in the forward thrust positions. This reduces the efficiency of the exhaust nozzle, thereby reducing the overall efficiency of the turbojet engine. In addition, the relatively small sizes of the side structures 6 necessitate external projections to accommodate the actuating mechanism, thereby further reducing the aerodynamic efficiency of the overall structure.

SUMMARY OF THE INVENTION

A thrust reverser is disclosed for a turbojet engine having a nacelle with a plurality of beams extending rearwardly from a rear portion of the nacelle on which are pivotally mounted thrust reverser baffles movable between forward thrust positions and reverse thrust positions. The thrust reverser baffles have forward edges, rear edges forming a portion of an exhaust nozzle when the baffles are in their forward thrust positions, outer baffle surfaces substantially flush with the outer surface of the nacelle when the baffles are in their forward thrust positions, and inner baffle surfaces forming a portion of a gas flow duct when the baffles are in their forward thrust positions, such that the exhaust nozzle has a width H measured in a direction parallel to the width of the beam h such that h is equal or greater than 0.6 H. In order to bias the thrust reverser baffles to remain in their forward thrust positions, the gases within the gas flow duct are prevented from acting on forward portions of the thrust reverser baffles when the baffles are in their forward thrust positions such that the resultant forces of the gases in the gas flow duct acting on the inner baffle surfaces when the baffles are in their forward thrust positions urge the baffles to remain in their forward thrust positions.

The invention will strongly reduce, or eliminate altogether, the opening bias of the thrust reverser baffles of the prior art. Additionally, at least portions of the downstream edges of the thrust reverser baffles are co-planar with the downstream edges of the beams, thereby reducing the aerodynamic losses at the nozzle exhaust.

Inner surfaces of the thrust reverser baffles, or the inner surfaces of the beams may be contoured or configured so as to impart a desired direction to the gases when the thrust reverser baffles are in their reverse thrust positions so as to prevent contact between the aircraft structure and the reverse thrust gases.

DETAILED DESCRIPTION OF THE PREFERRED EMBODIMENTS

Figure 1:
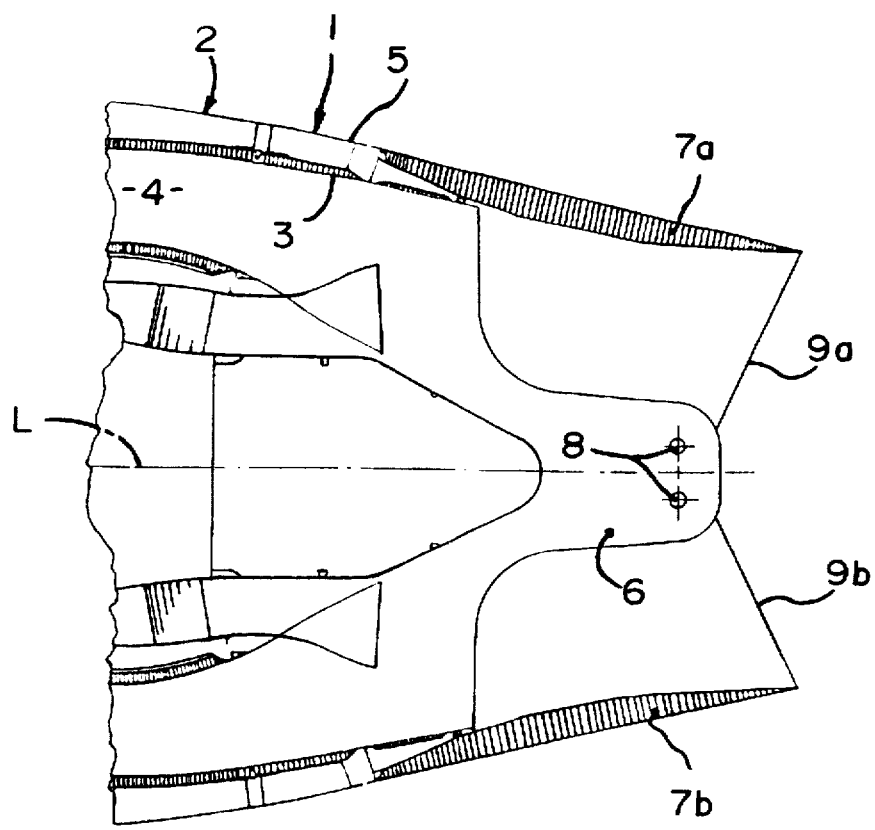
FIG. 1 is a partial, cross-sectional view illustrating a known type of thrust reverser.
Figure 2:
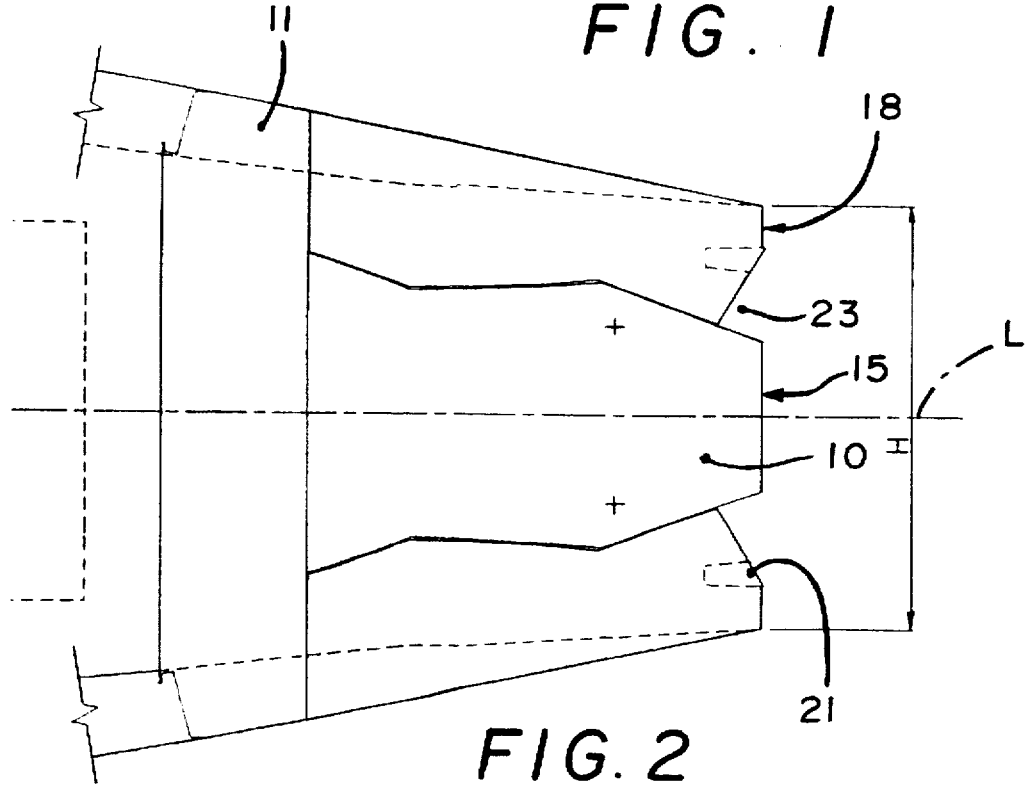
FIG. 2 is a side view of the thrust reverser according to the present invention with the thrust reverser baffles in their forward thrust positions.

A first embodiment of the present invention is illustrated in FIGS. 2–6 wherein it can be seen that a pair of beams 10 are fixedly connected with and extend rearwardly (towards the right as illustrated in FIG. 2) from a ring structure 11 which, in turn, is affixed at 12 on its forward side to the cowling or nacelle 13 enclosing the associated turbojet engine (not shown). As illustrated, the turbojet engine is of the bypass, turbo-fan type, but it is to be understood that the principles elucidated herewith may be applied to any type of turbojet engine.

The nacelle 13 forms an outer boundary of a circular gas flow passage and the ring structure 11 extending from the nacelle forms an extension of the nacelle 13 and also forms a portion of the boundary of the gas flow passage.

Inner surfaces 14 of the beams 10 also constitute a part of the outer boundary the passage for the gas flow, while outer beam surfaces 22 form a part of the external nacelle surface and are substantially flush with the outer surface with the nacelle 13 so as to minimize aerodynamic disturbances. The downstream, or rearmost, ends 15 of the beams 10 form parts of the exhaust nozzle for the exhaust gases.

One or more thrust reverser baffles 16 are pivotally attached to the beams 10 so as to pivot about axis 19 which is stationary with respect to the beams 10. The thrust reverser baffles 16 are driven by known mechanical systems 20 which may be housed within the beams 10. Since such systems are well known in the art, no further description of the actuator system, which may be hydraulic, pneumatic, or electric, and may be pulling or pushing types, win be disclosed. French Patent 2,704,907 illustrates typical examples of such known actuating systems. A feature of the present invention, however, resides in the fact that the entire mechanical actuating system structure 20 is contained within the beams 10 such that no component of the system protrudes into the reverse gas flow and, therefore, no part of the system is exposed to the hot gases when the baffle 16 is in the reverse thrust position.

Figure 3:
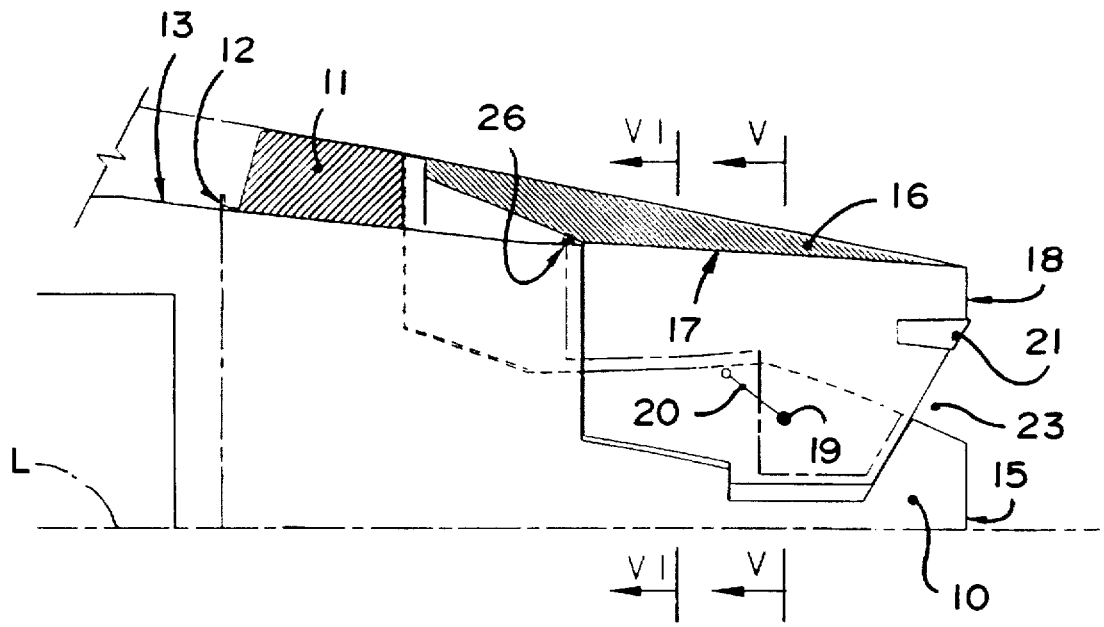
FIG. 3 is a partial, cross-sectional view of the thrust reverser of FIG. 2.

The ring structure 11 has a rearwardly extending portion having a seal 26 interposed between this portion and the inner surface of the thrust reverser baffle 16 when the baffle 16 is in the forward thrust position, as best illustrated in FIG. 3. This rearwardly extending portion prevents the pressurized gases within the gas flow duct from acting on the upstream, or forward portion of the thrust reverser door 16 such that it acts only on inner surface 17 which forms a portion of the gas flow duct. The resultant force of the pressurized gas is approximately longitudinally aligned with the pivot axis 19, or is slightly to the rear of such a pivot axis, so as to eliminate the opening biasing forces of the prior art devices. Since the resultant force is either at, or to the rear of the pivot axis, such forces will retain the thrust reverser baffles 16 in the forward thrust positions. Thus, the structure of the present invention can be lightened compared to the conventional systems, thereby saving weight and increasing the efficiency of the engine structure.

Figure 4:
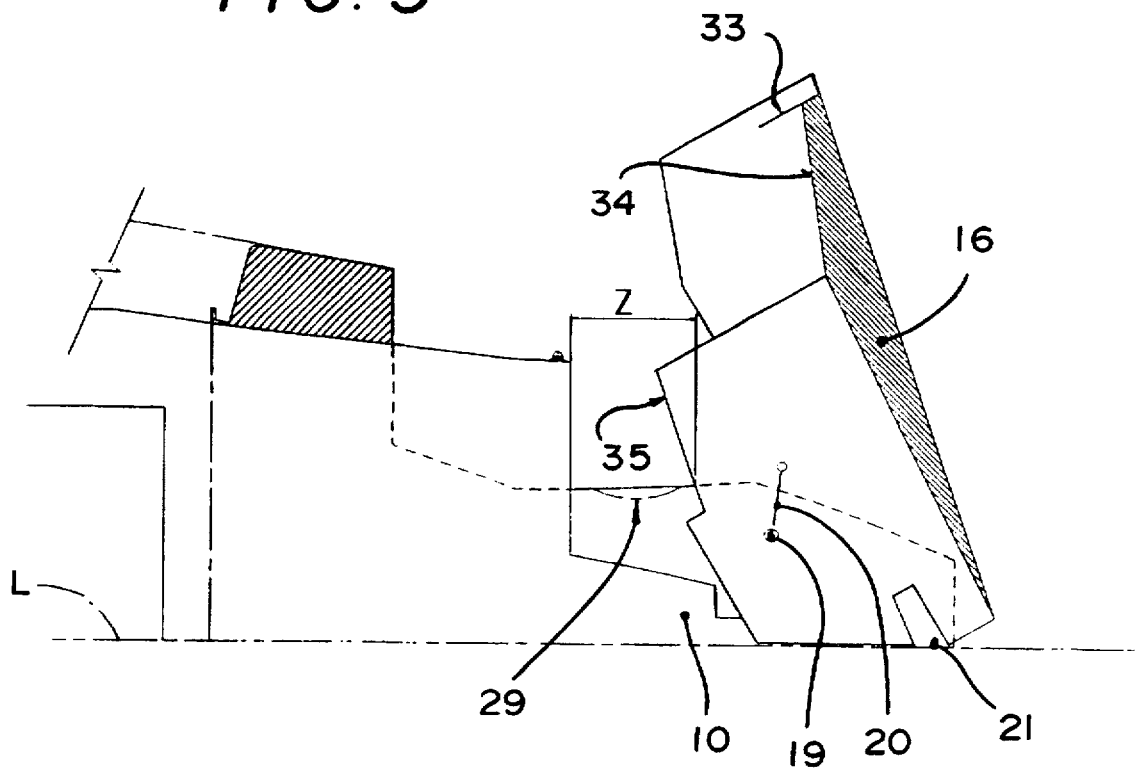
FIG. 4 is a partial, cross-sectional view similar to FIG. 3, but illustrating the thrust reverser baffle in the reverse thrust position.
Figure 5:
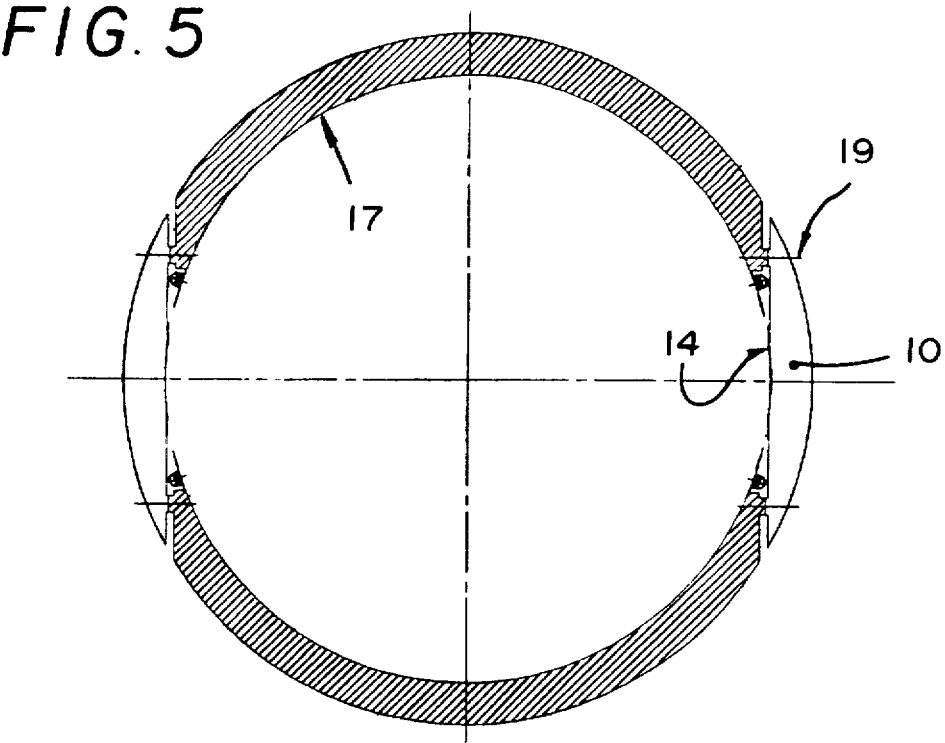
FIG. 5 is a cross-sectional view taken along line V—V in FIG. 3.
Figure 6:
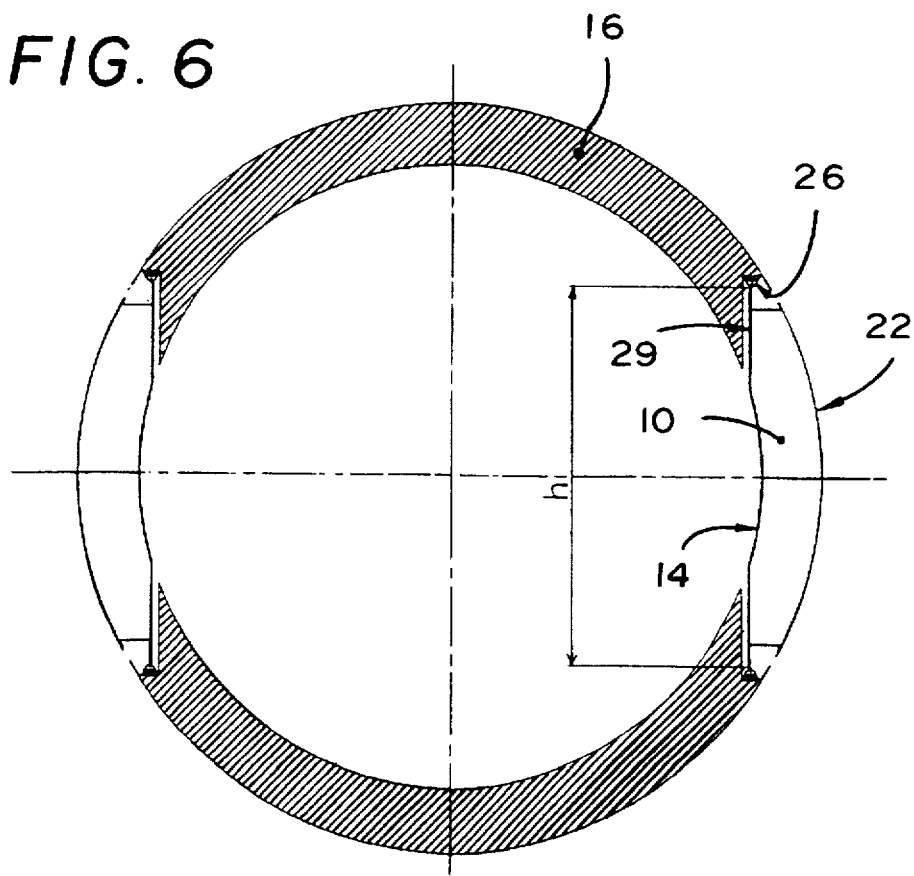
FIG. 6 is a cross-sectional view taken along line VI—VI in FIG. 3.
Figure 7:
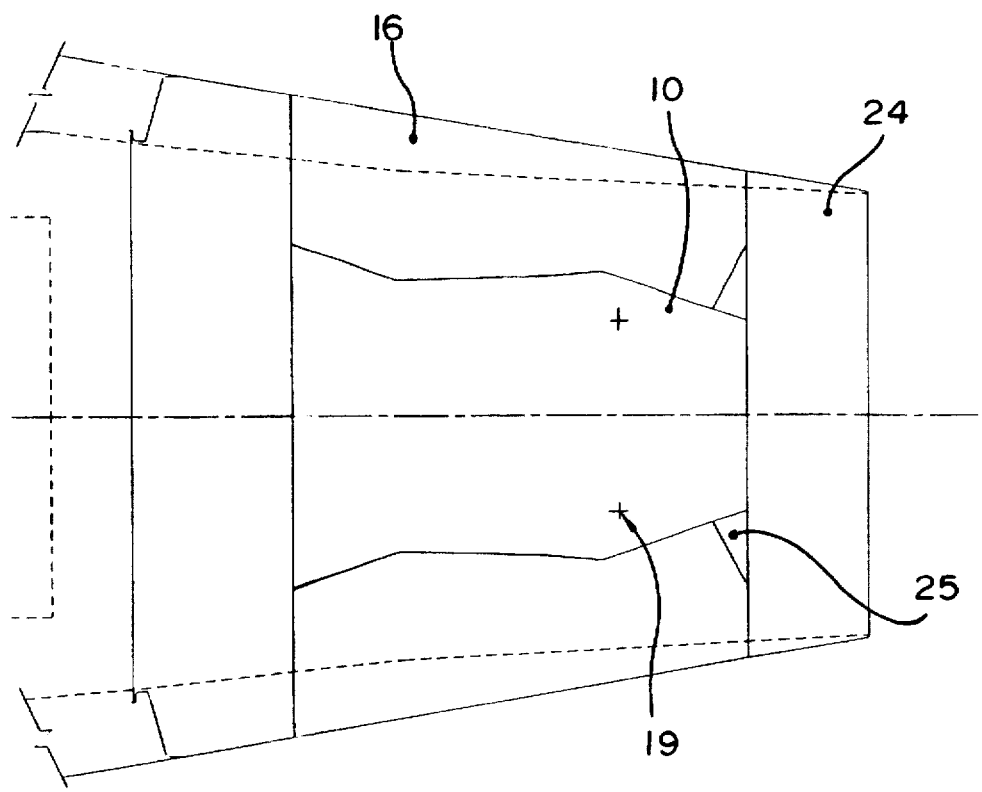
FIG. 7 is a side view of an alternative embodiment of the thrust reverser according to the present invention with the thrust reverser baffles in their forward thrust positions.

When the baffles are moved to their reverse thrust positions, as illustrated in FIG. 4, the stops 21, attached to or formed integral with the downstream edges of the baffles 16 contact each other so as to limit the travel of the baffles.

As noted previously, in order for the thrust reverser baffles 16 to be biased towards the forward thrust positions, the hinge axes 19 of the baffles 16 must be located approximately at the center of the forces of the gases acting on the inner walls 17 of the baffles 16. Accordingly, the hinge axes 19 of the baffles are situated as far forwardly, or upstream, (toward the left as viewed in FIG. 3) as possible and are moved commensurately away from the longitudinal axis L towards the outside of the nacelle. To facilitate these concepts, the beams 10 have a width h, illustrated in FIG. 6, measured in a direction contained in a plane extending perpendicular to the longitudinal axis L.

The nozzle also has a width H measured in a direction contained in a plane extending perpendicular to the longitudinal axis L and also passing through the axes 19 of H such that h is equal to or greater than 0.6 H. Forming the beams 10 of such a width improves the stability of both the stationary and movable assemblies, while the relatively larger outer surfaces 22 of the beams 10 imparts to them a relatively high inertia resulting in improved structural strength of the thrust reverser without adding undue weight. The design also insures a stable exhaust cross-section during all phases of operation.

Because the pivot axes 19 are positioned as far forwardly as possible and due to the thickness of the beams at that location, any external fairings or protrusions (such as shown in U.S. Pat. No. 4,005,836) to contain the actuating mechanisms may be eliminated to improve the aerodynamic efficiency of the structure. Obviously, a slight bulge may be utilized without thereby unreasonably degrading the aerodynamic performance.

Figure 8:
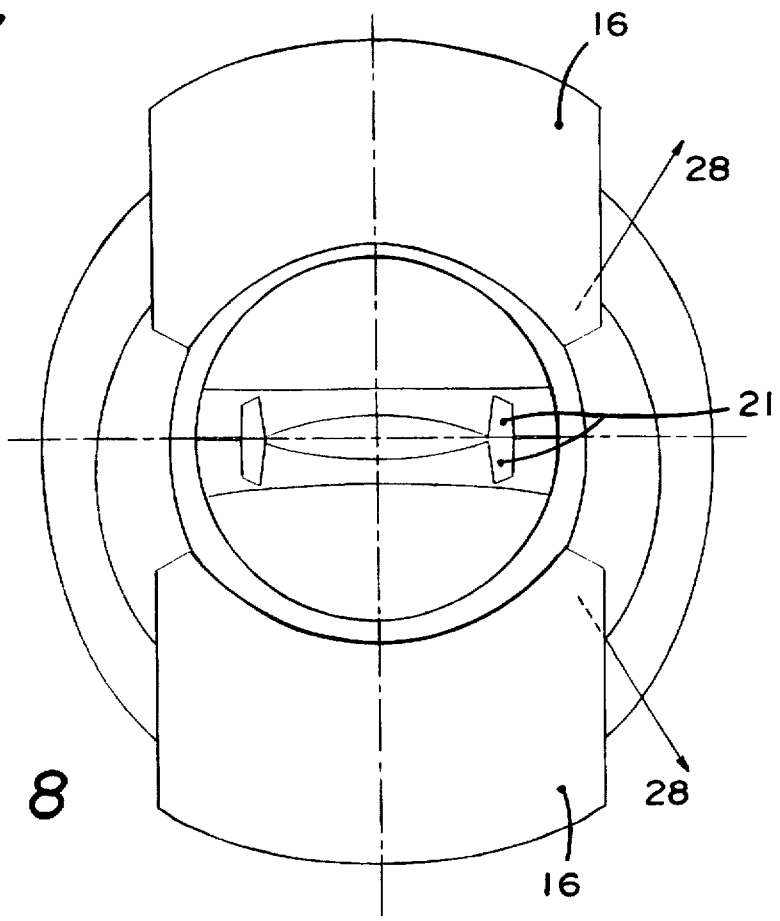
FIG. 8 is a rear view of the thrust reverser illustrated in FIG. 7 with the thrust reverser baffles in their reverse thrust positions.

Another feature made possible by the use of the increased width of beams 10, and best illustrated in FIG. 8, involves the imparting of a desired direction to the reverse thrust gases, illustrated by arrows 28 in FIG. 8. By configuring the inner walls 14 of the beams 10, as well as the inner surfaces 17 and 34 of the thrust reverser baffles 16, the gases in the reverse thrust positions may be directed away from nearby aircraft structures so as to prevent damage to these structures. The configurations may involve scalloping the inner walls, providing a bent back edge, forming a curved inner wall, or by any other design which will enable the expert to achieve the desired affect and direction of the reverse thrust gases. The flow direction of the reverse thrust gases may even be redirected to the inner wall 17 of the baffle 16.

The location of seal 26 enhances the self-closing bias of the baffles 16 and it is located as much as possible at the rearmost edge of the rearward extension of the ring structure 11 and to the rear of the forward portion of the baffle 16, as illustrated in FIG. 3. The seal may be attached to either the ring structure 11 and beam 10, or may be attached to the baffle 16.

The rearmost edges 18 of the baffles 16 are co-planar with the rearmost edges 15 of the beams 10, both lying in a plane extending generally perpendicular to the longitudinal axis L. A portion of the rear edges of the baffles 16 extend obliquely to the longitudinal axis L such that a space 23 is formed with the beams 10. The spaces 23 are dimensioned as a function of the opening angle of the baffles 16 (which determines the positions of the oblique portions of the rear edges) and the positions of the hinge axes 19, and are necessary in order to facilitate the movement of the baffles 16 to their reverse thrust positions, as illustrated in FIG. 4. The spaces 23 are decreased in size, compared to the prior art devices, thereby minimizing the efficiency losses in the nozzle when the baffles 16 are in their forward thrust positions.

If the thrust reverser utilizes a plurality of baffles 16 and drive systems 20, the baffles 16 may each have different opening angles. Lateral longitudinal edges 35 of the baffles 16 may also be contoured so as to be asymmetrical with corresponding edges of the same baffle, or edges of the adjacent baffles. A deflector 33 may be located on the forward-most edges of the baffles 16 forwardly of inner surface portion 34, the configurations of these elements may also differ from baffle to baffle. The specific configurations of the baffles, the inner surfaces 34, the deflectors 33 and the longitudinal lateral edges 35 may be utilized to control the direction of the gas flow in the reverse thrust operation.

An alternative embodiment of the invention is illustrated in FIGS. 7–10. In this embodiment, the beams 10, the baffles 16 and the positions of the pivot axes 19 are all identical to the previously described embodiment. A rear ring structure 24 is fixedly attached to, or formed integrally with, the beams 10 and is located at the downstream edges of the beams 10. The rear ring forms the nacelle termination such that its outer surface is generally flush with the outer surfaces of the beams 10 and baffles 16 when the baffles 16 are in their forward thrust positions so as to retain aerodynamic efficiency. Alternatively, the rear ring 24 may be detachable from the beams 10 and may also be formed of several elements affixed together.

Extending forwardly from rear ring 24 are tabs 25 which extend into the spaces 23 so as to completely block the spaces and prevent passage therethrough of exhaust gases so as to maximize the efficiency of the thrust reverser. Again, tabs 25 may be formed integrally with the ring 24, or may be separate elements detachably attached thereto.

Seal 27 is interposed between the forward most edge of the ring 24 and rear portions of the thrust reverser baffles 16 so as to effect a seal between these elements and, again, to prevent leakage therethrough of the gases in the gas flow duct. The seal 27 may be attached to either the rear ring 24, or to the baffle 16.

Figure 10:
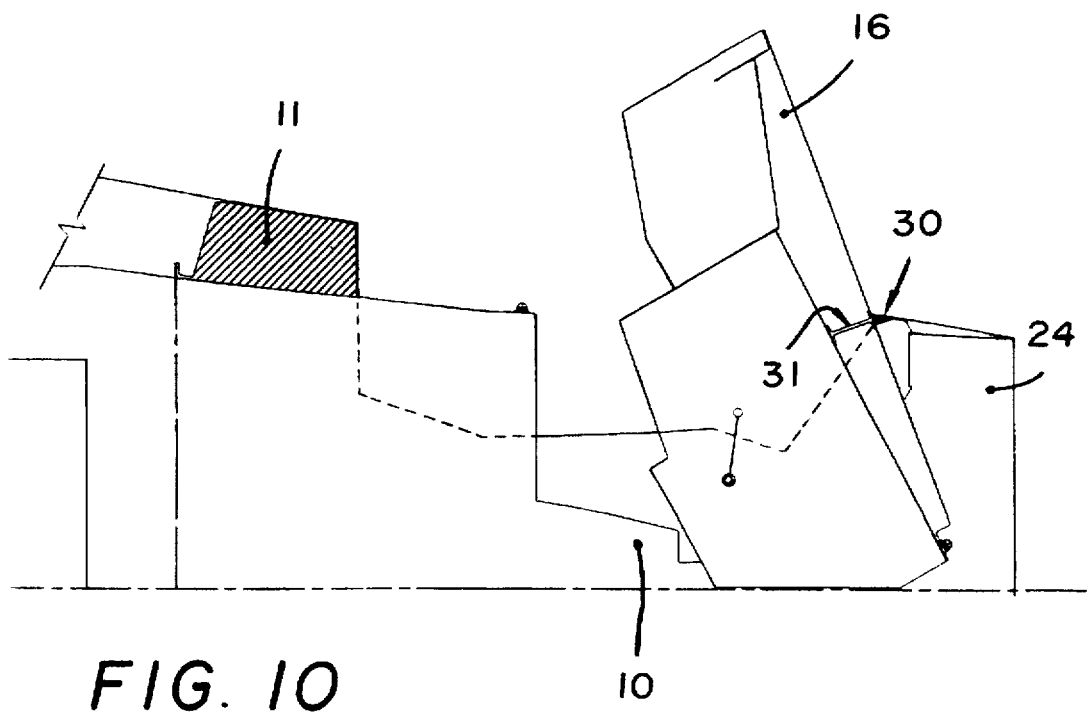
FIG. 10 is a partial, cross-sectional view similar to FIG. 9, but illustrating the thrust reverser baffle in the reverse thrust position.

As illustrated in FIG. 10, the forward edge of rear ring 24 may act as a stop 30 by bearing against the outer surface of the baffle 16 to limit the movement of the baffle 16 into the reverse thrust position. In order to prevent damage to the baffle 16, a reinforcement 31 may be mounted internally between the inner and outer surfaces. In this embodiment, the configurations of the rear ring 24 and the baffles 16 enable the leaks between the baffles and the ring to be minimized when in the reverse thrust mode.

Figure 9:
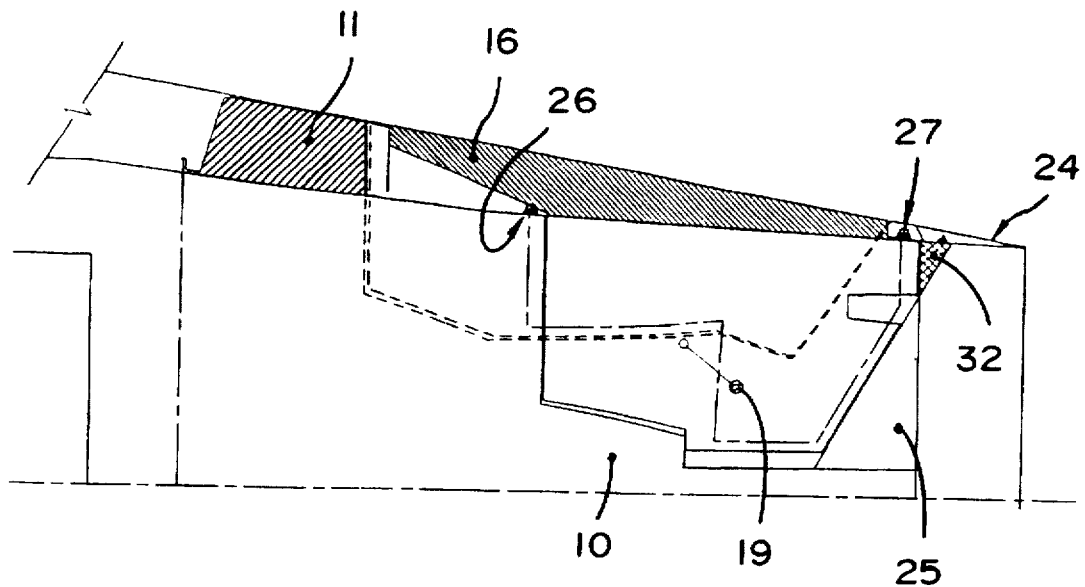
FIG. 9 is a partial, cross-sectional view of the thrust reverser of FIG. 7.

The rear edge of the thrust reverser baffles 16 may have an extension 32 which extends rearwardly of the forward edge of the rear ring 24, as best illustrated in FIG. 9. This feature enhances the self-closing bias of the forces acting on the baffles 16 when they are in their forward thrust mode. The increased surface area downstream or to the rear of the pivot axis 19 allows enhancing the resultant forces caused by the gas flow circulating in the gas flow passage toward a self-closing bias on the baffles 16.

The foregoing description is provided for illustrative purposes only and should not in any way be construed as limiting this invention, the scope of which is defined solely by the appended claims.

We claim:

1. A thrust reverser for a turbojet engine having a nacelle with an inner surface forming an outer boundary of a gas flow duct having a longitudinal axis, and an outer surface, the thrust reverser comprising:
   a) a plurality of beams extending rearwardly from a rear portion of the nacelle;
   b) at least one thrust reverser baffle pivotally attached to the plurality of beams so as to move between a forward thrust position and a reverse thrust position about a pivot axis, the at lease one thrust reverser baffle having a forward edge, a rear edge, an outer baffle surface substantially flush with the outer surface of the nacelle when the baffle is in the forward thrust position, and an inner baffle surface, a portion of the inner baffle surface forming a portion of the gas flow duct when the baffle is in the forward thrust position, whereby each beam has a beam width h measured forwardly of the pivot axis and whereby the exhaust nozzle has a width H measured in a direction parallel to the beam width h such that h is at least equal to 0.6 H; and,
   c) means preventing gases in the gas flow duct from contacting a forward portion of the at least one baffle when the at least one baffle is in the forward thrust position such that the force of the gases in the gas flow duct acting on the inner baffle surface when the at least one baffle is in the forward thrust position urge the at least one baffle to remain in the forward thrust position wherein the means preventing gas contact with the forward portion of the at least one baffle comprises:
      i) a forward structure fixedly connected to the nacelle forwardly of the at least one thrust reverser baffle, the forward structure having an inner portion extending between the gas flow duct and a forward portion of the at least one baffle; and,
      ii) a seal interposed between the inner portion of the forward structure and the inner baffle surface.

2. The thrust reverser of claim 1 wherein the plurality of beams each have an outer beam surface substantially flush with the outer surface of the nacelle.

3. The thrust reverser of claim 1 wherein the plurality of beams each have an inner beam surface forming a portion of the gas flow duct.

4. The thrust reverser of claim 1 wherein the plurality of beams comprises a pair of beams extending from opposite sides of the nacelle.

5. The thrust reverser of claim 1 wherein the plurality of beams each have a rearmost edge co-planar with the rear edge of the at least one baffle.

6. The thrust reverser of claim 1 wherein the at least one thrust reverser baffle comprises two baffles.

7. The thrust reverser of claim 1 further comprising a rear ring structure mounted on the plurality of beams and extending rearwardly of the rear edge of the at least one thrust reverser baffle.

8. The thrust reverser of claim 7 wherein a portion of the rear edge of the at least one thrust reverser baffle extends obliquely to the longitudinal axis so as to form a space between the beams, the at least one baffle and the rear ring structure and further comprising a tab extending from the rear ring structure so as to fill the space.

9. The thrust reverser of claim 7 wherein the rear ring structure has a forward edge and further comprising an extension extending from the rear edge of the at least one baffle rearwardly of the forward edge of the rear ring structure.

10. The thrust reverser of claim 7 wherein the rear ring structure has a forward edge located so as to contact the at least one thrust reverser baffle when the at least one baffle is in the reverse thrust position to limit the pivoting movement of the at least one thrust reverser baffle.

11. The thrust reverser of claim 7 further comprising a seal between the rear ring structure and the baffle.

* * * * *